No. 748,099. Patented December 29, 1903.

UNITED STATES PATENT OFFICE.

BARTOLOMEJ PRIKRYL, OF CHICAGO, ILLINOIS.

COMPOSITION OF INGREDIENTS FOR IMPROVING STORAGE EGGS.

SPECIFICATION forming part of Letters Patent No. 748,099, dated December 29, 1903.

Application filed June 22, 1903. Serial No. 162,580. (No specimens.)

*To all whom it may concern:*

Be it known that I, BARTOLOMEJ PRIKRYL, a citizen of the United States, residing at the city of Chicago, county of Cook, and State of Illinois, have invented and discovered a new and useful composition of ingredients to improve storage eggs in such a manner that the peculiar taste incident to them entirely disappears—i. e., it disguises the taste of storage eggs in such a way that no trace of the peculiar taste incident to them remains—of which the following is a specification.

My composition consists of the following ingredients, combined in the proportions stated, viz: First, rectified spirits, fifty-five grains; second, pure glycerin, fifty-five grains; third, extract of sweet orange-peel, fifteen grains; fourth, extract of vanilla, fifteen grains; fifth, extract of Spanish saffron, two grains; sixth, amyl valerianate, two grains; seventh, salicylic acid, one grain.

A detailed description of the mode and process of making this composition may be stated as follows: First mix rectified spirits, consisting of fifty-five grains, with salicylic acid of one grain, these to be mixed thoroughly together. Then take pure glycerin, consisting of fifty-five grains, and mix it with the composition made by mixing rectified spirits and salicylic acid as aforesaid. After this last result has been obtained—viz., the mixture obtained by combining the first two aforesaid with the latter one—then mix in separately the following: Extract of sweet orange-peel, consisting of fifteen grains; extract of vanilla, consisting of fifteen grains; extract of Spanish saffron, consisting of two grains, and amyl valerianate, consisting of two grains, in the order they are mentioned, these last aforesaid to be thoroughly mixed in the order mentioned with the composition obtained by mixing said rectified spirits, consisting of fifty-five grains, and salicylic acid, one grain, with pure glycerin, fifty-five grains, as aforesaid. After these various steps have been taken my composition is ready for use. One receptacle may be used in this process. No intermission is necessary in following out this process, this composition to be used in eggs that had been stored for some time and not freshly or recently laid eggs, and it is to be applied only after such storage eggs had been broken open and when they have assumed a liquid state. To one quart of storage eggs in such liquid state one-half teaspoonful of my composition is to be applied, this ratio to be followed throughout in dealing with larger quantities.

I am aware that one or either of these or any two or three have been used for various purposes; but I am not aware that all the ingredients of my composition have been used together and for the purpose aforesaid.

This composition, for which a patent is solicited, is a combination of the ingredients heretofore mentioned and in the manner aforesaid, which by experiment has proven that it will improve storage eggs in such a manner that the peculiar taste incident to them entirely disappears—i. e., it disguises the taste of storage eggs in such a way that no trace of the peculiar taste incident to them remains. This composition is intended to be applied only to eggs thus held in storage, a great many of which are in use, as is well known in the trade.

Of course my composition can never cure spoiled eggs and is not intended to be so applied.

My composition is perfectly harmless and does not endanger the public health in any way, shape, or manner.

My composition is to be used particularly by bakers and those who have occasion to use storage eggs extensively. They claim that the taste peculiar to storage eggs is not noticed by the ordinary individual, which therefore does not prevent their sale to and consumption by the public at large; but the moment it is used in pastry, cakes, or the like it spoils such pastry and cake and renders them unfit for use.

What I claim as my invention, and desire to secure by Letters Patent of the United States, is—

The herein-described composition to improve storage eggs, consisting of rectified spirits, pure glycerin, extract of sweet orange-peel, extract of vanilla, extract of Spanish saffron, amyl valerianate and salicylic acid, in proportions substantially as described, and for the purpose specified.

BARTOLOMEJ PRIKRYL.

Witnesses:
KONRAD RICKER,
WALTER TRUE.